(12) United States Patent
Jung et al.

(10) Patent No.: US 9,489,239 B2
(45) Date of Patent: Nov. 8, 2016

(54) SYSTEMS AND METHODS TO MANAGE TIERED CACHE DATA STORAGE

(71) Applicant: PernixData, Inc., San Jose, CA (US)

(72) Inventors: Woon Ho Jung, Cupertino, CA (US); Nakul Dhotre, Santa Clara, CA (US); Deepak Jain, San Jose, CA (US); Anthony Pang, San Jose, CA (US)

(73) Assignee: PernixData, Inc., San Jose, CA (US)

( * ) Notice: Subject to any disclaimer, the term of this patent is extended or adjusted under 35 U.S.C. 154(b) by 0 days.

(21) Appl. No.: 14/810,366

(22) Filed: Jul. 27, 2015

(65) Prior Publication Data

US 2016/0041907 A1 Feb. 11, 2016

Related U.S. Application Data

(63) Continuation-in-part of application No. 14/455,090, filed on Aug. 8, 2014, and a continuation-in-part of application No. 14/609,085, filed on Jan. 29, 2015.

(51) Int. Cl.
*G06F 12/10* (2016.01)
*G06F 9/50* (2006.01)
*G06F 12/12* (2016.01)

(52) U.S. Cl.
CPC ............ *G06F 9/50* (2013.01); *G06F 12/10* (2013.01); *G06F 12/12* (2013.01)

(58) Field of Classification Search
CPC ........... G06F 9/50; G06F 12/10; G06F 12/12
See application file for complete search history.

(56) References Cited

U.S. PATENT DOCUMENTS

| | | | | |
|---|---|---|---|---|
| 8,006,061 B1* | 8/2011 | Chatterjee | ............. | G06F 3/0605 711/170 |
| 8,255,660 B1* | 8/2012 | Chatterjee | ............. | G06F 3/0605 711/170 |
| 8,397,028 B2* | 3/2013 | Spackman | ........ | G06F 17/30097 707/753 |
| 8,812,811 B1* | 8/2014 | Chatterjee | ............. | G06F 3/0605 711/100 |
| 2007/0124560 A1* | 5/2007 | van Riel | ................ | G06F 12/123 711/216 |
| 2010/0106852 A1* | 4/2010 | Kindig | .............. | G06F 17/30035 709/231 |
| 2011/0197046 A1* | 8/2011 | Chiu | ...................... | G06F 3/0617 711/171 |
| 2011/0295855 A1* | 12/2011 | Wang | ................. | G06F 17/30584 707/737 |
| 2012/0221708 A1* | 8/2012 | Bhardwaj | ............... | H04L 67/10 709/224 |
| 2014/0279905 A1* | 9/2014 | Muniswamy-Reddy | | G06F 11/20 707/639 |
| 2014/0310476 A1* | 10/2014 | Kruus | .................. | G06F 12/0871 711/133 |
| 2016/0117323 A1* | 4/2016 | Sen | ...................... | G06F 17/3033 707/747 |

* cited by examiner

*Primary Examiner* — John A Lane
(74) *Attorney, Agent, or Firm* — Gard & Kaslow LLP

(57) ABSTRACT

Systems and methods for managing records stored in a storage cache are provided. A cache index is created and maintained to track where records are stored in buckets in the storage cache. The cache index maps the memory locations of the cached records to the buckets in the cache storage and can be quickly traversed by a metadata manager to determine whether a requested record can be retrieved from the cache storage. Bucket addresses stored in the cache index include a generation number of the bucket that is used to determine whether the cached record is stale. The generation number allows a bucket manager to evict buckets in the cache without having to update the bucket addresses stored in the cache index. Further, the bucket manager is tiered thus allowing efficient use of differing filter functions and even different types of memories as may be desired in a given implementation.

14 Claims, 15 Drawing Sheets

SYSTEMS AND METHODS TO MANAGE
TIERED CACHE DATA STORAGE

This application is a continuation-in-part of and claims priority to U.S. application Ser. No. 14/455,090 filed on Aug. 8, 2014 and entitled "Systems and Methods to Manage Cache Data Storage", and is also a continuation-in-part of and claims priority to U.S. application Ser. No. 14/609,085 filed on Jan. 29, 2015 and entitled "Systems and Methods to Manage Cache Data Storage in Working Memory of Computing System", each of which is hereby incorporated by reference in its entirety.

BACKGROUND

1. Field

This patent application relates generally to data caching and more specifically to managing cache data storage.

2. Description of Related Art

In computing systems, a cache is a memory system or subsystem which transparently stores data so that future requests for that data can be served faster. As an example, many modern microprocessors incorporate an instruction cache holding a number of instructions; when the microprocessor executes a program loop where the same set of instructions are executed repeatedly, these instructions are fetched from the instruction cache, rather than from an external memory device at a performance penalty of an order of magnitude or more.

In other environments, such as where a computing system hosts multiple virtual machines under the control of a hypervisor, with each virtual machine running one or more applications, caching of objects stored on a network attached storage system can provide significant performance improvements. In some instances, records are cached and then written to the network attached storage system according to a "write back" algorithm. In the "write back" algorithm, the received record is written to the cache before being written to the network attached storage system. The cache system can then direct the writing of the record to the network attached storage system.

When read commands are sent from the virtual machine to the network attached storage, it may be more efficient to read the records from the cache rather than from the network attached storage. While other write-through and write-back caching algorithms exist, caching and retrieving data quickly and accurately remains a challenge.

One common challenge in caching systems is that the read and write operations to the cache system are not optimized for the operational characteristics of the media used to store the contents of the cache system. Some examples of media used to store the contents of a cache system are random access memory (RAM), solid state disk (SSD), PCIe Flash, Non-volatile dual in-line memory module (NVDIMM), etc. Organizing data on a cache device for a plurality of cache media types remains a challenge.

Finally, storing data to, and removing data from, a cache system requires vigorous updates of metadata records of the cache system (e.g., index entries that reference the data stored in the cache system at any given point in time). These updates impose a significant performance overhead to storing, retrieving, and removing data from the cache system. As cache system media becomes faster, the overhead becomes a significant portion of the overall cache operation time and hampers efficient performance. More efficient metadata records for the cache system are required.

SUMMARY

According to some embodiments, a method of performing read commands and write commands to a tiered bucket manager comprising a master bucket manager, a slave bucket manager and a migration thread, the method comprising: receiving a write command sent from a first virtual machine to a host operating system running on a computing system, the write command instructing a storage system to store a first record at a first memory location, and storing the first record in a first bucket of the master bucket manager if the master bucket manager is not full, else evicting a second bucket of the master bucket manager that has been migrated to the slave bucket manager and storing the first record in the evicted second bucket of the master bucket manager, else evicting a third bucket of the master bucket manager and storing the first record in the third bucket of the master bucket manager; and receiving a read command sent from the first virtual machine to the host operating system running on the computing system, the read command instructing the storage system to read a second record from a second memory location, and determining that the second record is in the master bucket manager and reading the second record from the master bucket manager, else determining that the second record has been evicted or migrated from the master bucket manager, determining that the second record is in the slave bucket manager, reading the second record from the slave bucket manager, performing a reverse filter function on the second record read from the slave bucket manager using the migration thread, writing the reverse filter functioned second record to the master bucket manager, and reading the reverse filter functioned second record from the master bucket manager.

In a further embodiment, the method further comprising migrating a third record from the master bucket manager to the slave bucket manager by: determining that the master bucket manager is under pressure; identifying a coldest bucket of the master bucket manager; performing a filter function on contents of the coldest bucket of the master bucket manager using the migration thread; writing the filter functioned contents of the coldest bucket of the master bucket manager to the slave bucket manager; updating, in a translation table of the tiered bucket manager, a reference to the coldest bucket of the master bucket manager to further reference the slave bucket manager; and marking as migrated the coldest bucket of the master bucket manager.

According to some embodiments, a system comprising: a master bucket manager configured to store cached records; a slave bucket manager configured to store cached records migrated from the master bucket manager; a migration thread configured to migrate cached records from the master bucket manager to the slave bucket manager using a filter function; and a translation table configured to store references to cached records stored in the master bucket manager and cached records migrated from the master bucket manager to the slave bucket manager.

According to some embodiments, a non-transitory computer readable storage medium having instructions embodied thereon, the instructions executable by one or more processors to perform read commands and write commands to a tiered bucket manager comprising a master bucket manager, a slave bucket manager and a migration thread, comprising: receiving a write command sent from a first virtual machine to a host operating system running on a computing system, the write command instructing a storage system to store a first record at a first memory location, and storing the first record in a first bucket of the master bucket manager if the master bucket manager is not full, else evicting a second bucket of the master bucket manager that has been migrated to the slave bucket manager and storing the first record in the evicted second bucket of the master bucket manager, else evicting a third bucket of the master bucket manager and storing the first record in the third bucket of the master bucket manager; and receiving a read command sent from the first virtual machine to the host operating system running on the computing system, the read command instructing the storage system to read a second record from a second memory location, and determining that the second record is in the master bucket manager and reading the second record from the master bucket manager, else determining that the second record has been evicted or migrated from the master bucket manager, determining that the second record is in the slave bucket manager, reading the second record from the slave bucket manager, performing a reverse filter function on the second record read from the slave bucket manager using the migration thread, writing the reverse filter functioned second record to the master bucket manager, and reading the reverse filter functioned second record from the master bucket manager.

DETAILED DESCRIPTION

Write-back and write-through caching techniques are used to reduce the amount of time required by a computing system to process read and write commands (also referred to as "IO" commands) by storing those commands in a faster, short-term memory, such as a storage cache, instead of relying solely on a slower, long-term memory, such as a storage system. Records can be written to or read from the storage cache during operation.

A typical IO command identifies a record using a memory location of the storage system. However, the caching system does not store the record at an address in the storage cache that is immediately recognizable from the memory location of the storage system. To read from the storage cache, it is necessary to have a way to determine where the record is stored in the storage cache from the memory location of the storage system. According to various embodiments described herein, a cache index is used to map a memory location of the storage system to a location in the storage cache when a record is written to the storage cache. The cache index may be extended to accommodate IO commands smaller than a predefined size. As described in the illustrative examples included herein, the cache index can be in the form of a BTree (also known as a Bayer Tree, Bushy Tree, or Boeing Tree).

The records are stored in buckets within the storage cache. A bucket is a predefined contiguous set of locations in the storage cache. Each bucket is allocated to one virtual machine at a time. The bucket has a bucket address that includes a bucket identifier, a bucket index, and a generation number. From the bucket identifier and the bucket index, a location in the storage cache can be identified. From the generation number, a determination can be made as to whether the record stored in the bucket is stale.

Figure 1:
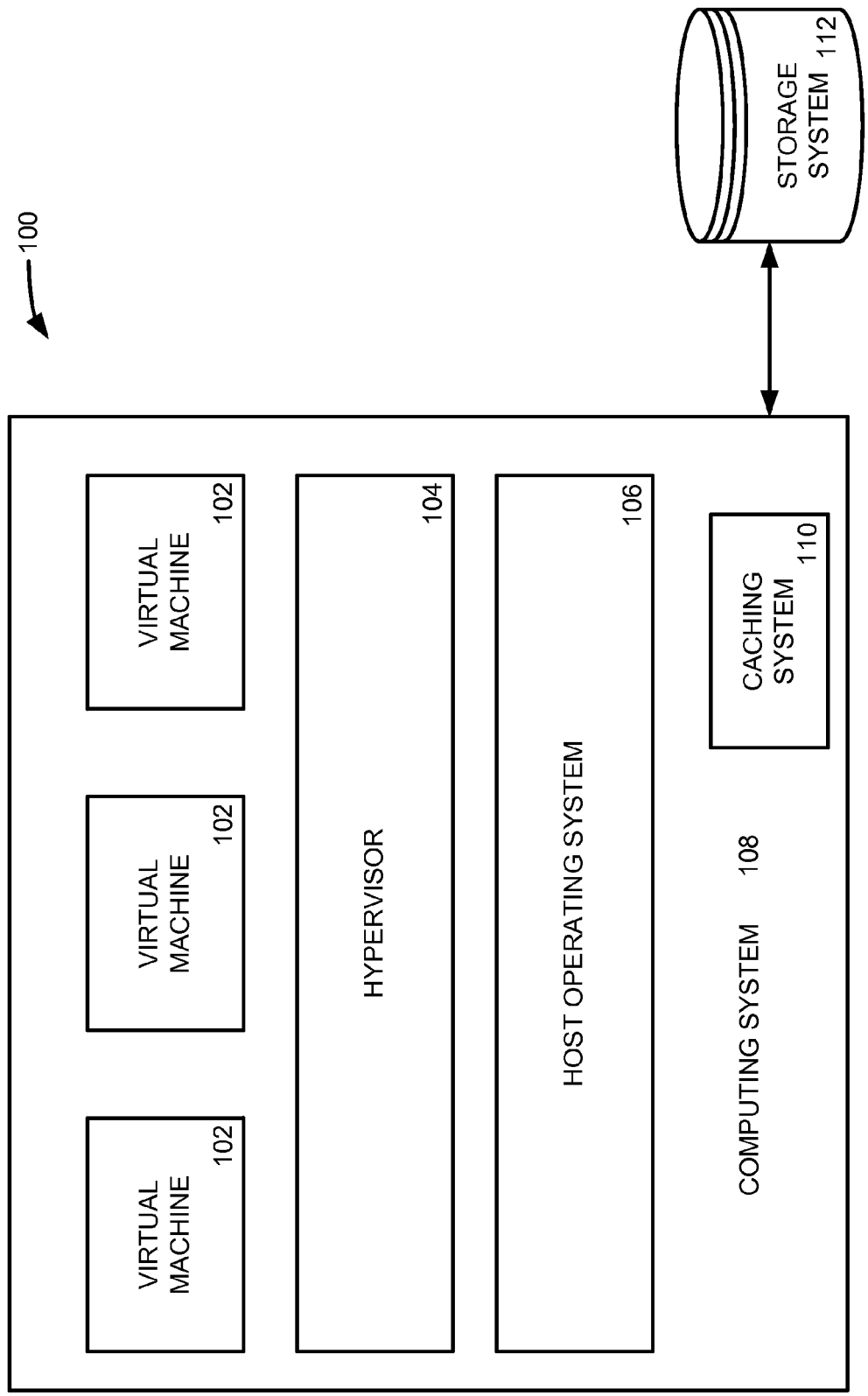
FIG. 1 is a block diagram of a portion of an environment in which various embodiments can be practiced.

FIG. 1 is a block diagram of a portion of an environment 100 in which various embodiments can be practiced. The environment 100 comprises one or more virtual machines 102 executed by a hypervisor 104. The hypervisor 104 is executed by a host operating system 106 (which may itself include the hypervisor 104). The host operating system 106 resides on a physical computing system 108 having a caching system 110. The caching system 110 caches data within a local memory (e.g., a storage cache 208, discussed herein). The local memory is a faster, more expensive memory such as flash memory. The computing system 108 is configured to communicate with a storage system 112 to store data. The storage system 112 is a slower memory, such as a hard disk. The environment 100 can include multiple computing systems 108 and/or storage systems 112. Examples of storage system 112 include, but are not limited to, a storage area network (SAN), a local disk, a shared serial attached "small computer system interface (SCSI)" (SAS) box, a network file system (NFS), a network attached storage (NAS), and an object store.

When a virtual machine 102 generates a read command or a write command, the application sends the generated command to the host operating system 106. The virtual machine 102 includes, in the generated command, an instruction to read or write a record at a specified location in the storage system 112. The caching system 110 receives the sent command and caches the record and the specified storage system memory location. In a write-back system, the generated write commands are subsequently sent to the storage system 112.

In some embodiments of the present approach, and as is apparent to those skilled in the art in light of the teachings herein, the environment 100 of FIG. 1 can be further simplified to being a computing system running an operating system running one or more applications that communicate directly or indirectly with the storage system 212.

Figure 2:
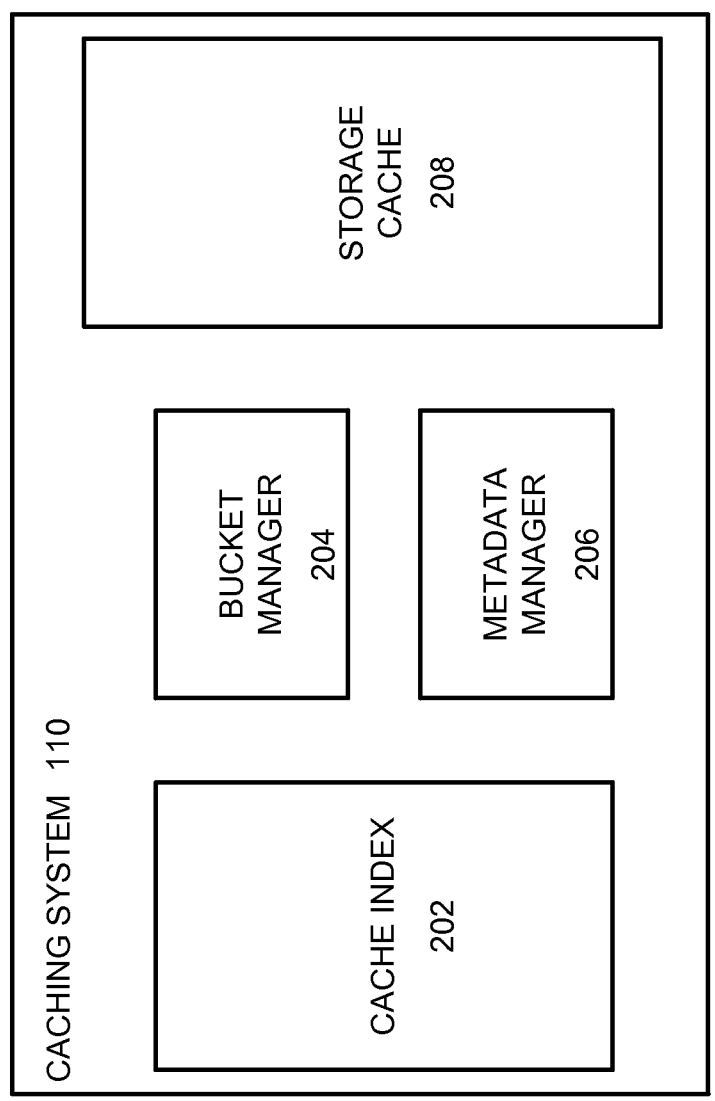
FIG. 2 is a block diagram of a caching system, according to various embodiments.

FIG. 2 is a block diagram of the caching system 110, according to various embodiments. The caching system 110 comprises a cache index 202, a bucket manager 204, a metadata manager 206, and a storage cache 208. The caching system 110 can be implemented in a variety of ways known to those skilled in the art including, but not limited to, as a computing device having a processor with access to a memory capable of storing executable instructions for performing the functions of the described modules. The computing device can include one or more input and output components, including components for communicating with other computing devices via a network (e.g., the Internet) or other form of communication. The caching system 110 comprises one or more modules embodied in computing logic or executable code such as software.

A cache index 202 is a logical data structure stored by the caching system 110. The cache index 202 is configured to store, for each memory location in the storage system 112 that has a record written thereto, a bucket address of a bucket in which a cached copy of the record is stored. In some embodiments, the cache index 202 is a BTree, as discussed in greater detail in connection with FIGS. 3-5.

When an IO command (e.g., a read command or a write command) is received, the bucket manager 204 is configured to determine the location in the storage cache 208 containing the desired record from the bucket address 404 in the cache index 202. The bucket manager 204 then executes the command or causes the command to be executed by another component of the caching system 110. The functionalities of the bucket manager 204 are explained in greater detail in connection with FIGS. 6-10.

The metadata manager 206 allocates those portions of the cache index 202 that correspond to memory locations in the storage system 112 (e.g., SAN memory locations) where records that have been cached in the cache storage 208 are stored or will be stored. The metadata manager 206 further traverses the cache index 202 to determine whether a record is stored in the storage cache 208. The metadata manager 206 can allocate or de-allocate levels, nodes, or entries in the cache index 202 depending on where records in the cache are stored in the storage system 112. As such, the size of the cache index 202 can be increased or decreased depending on the amount of records presently cached in the storage cache 208. The metadata manager 206 can expand the cache index 202 to include additional entries or levels. The functionalities of the metadata manager 206 are explained in greater detail in connection with FIGS. 6-10.

In an embodiment, the cache index 202 is organized into three levels and can be expanded to four levels, as discussed elsewhere herein. Each level of the cache index 202 contains one or more entries that are representative of a continuous range of memory locations in the storage system 112. For example, in embodiments where the storage system 112 is a SAN, SAN memory locations, expressed as SAN offset addresses, are divided within the cache index 202 so as to be contiguous with one another.

Figure 3:
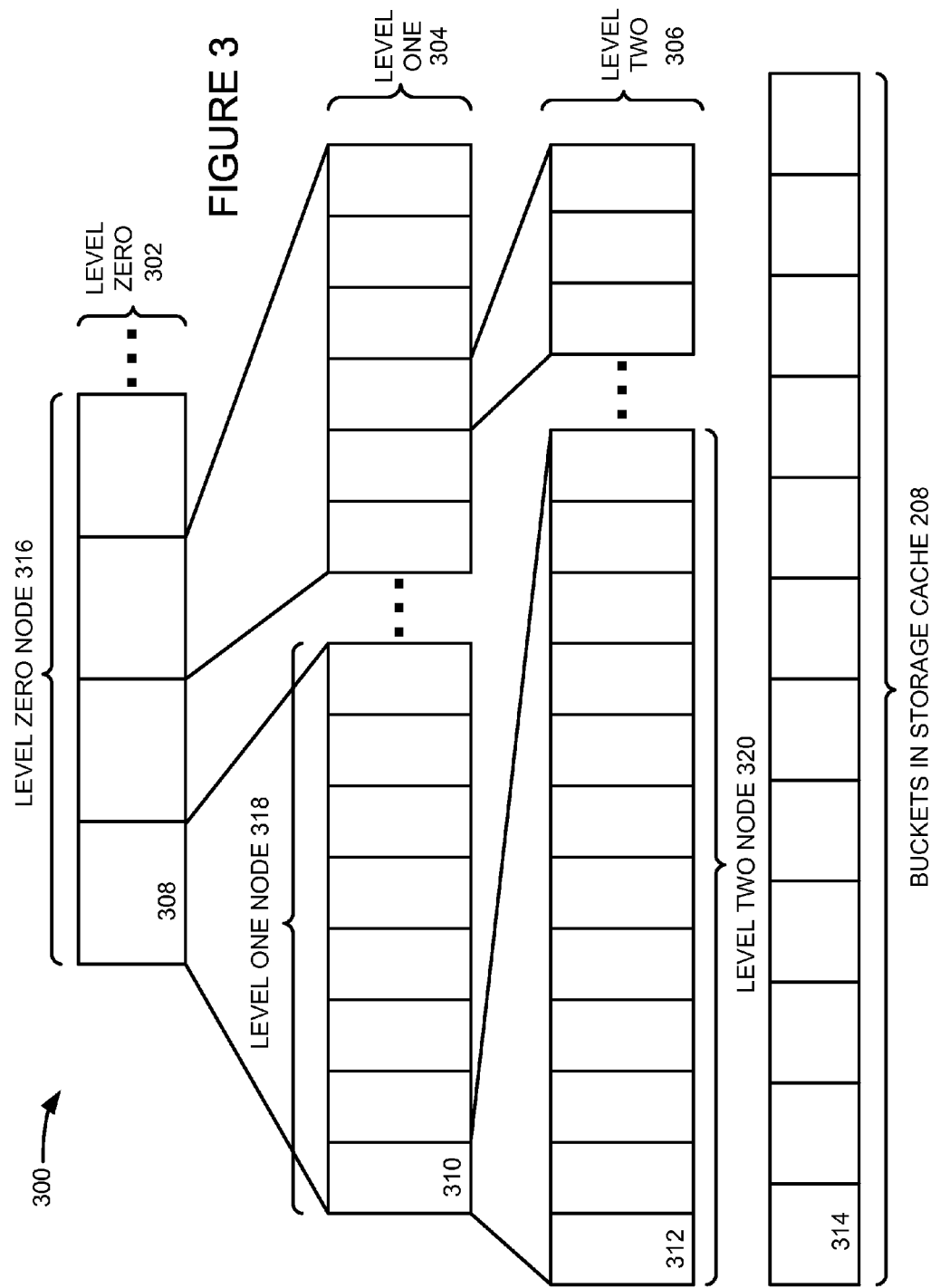
FIG. 3 is a diagram of a cache index in the form of a BTree, according to various embodiments.

To illustrate, FIG. 3 is a diagram of a cache index 202 in the form of a BTree 300, according to various embodiments. The BTree 300 has three levels, depicted as levels zero 302, one 304, and two 306. Due to space limitations of the figures, all of the entries and nodes in the BTree 300 are not depicted. As explained in greater detail elsewhere herein, level two 306 includes bucket addresses that specify cache locations organized in terms of buckets in the storage cache 208. In the example embodiment of FIG. 3, the storage system 112 is a SAN and memory locations in the storage system 112 are referred to as "SAN memory locations".

Level zero 302 comprises a single level zero node 316 having a series of entries that, in turn, correspond to a range of SAN memory locations of the SAN. The entries within the level zero node 316 at the level zero 302 collectively correspond to all of the SAN memory locations. To illustrate, level zero 302 can contain 16 entries each corresponding to one sixteenth of the available SAN memory locations. The level zero entry 308 can correspond to a first sixteenth of the SAN memory locations, the adjacent entry can correspond to a second sixteenth of the SAN memory locations, and so on for the third and fourth entries. In an embodiment, the individual entries within the level zero 302 comprise 16 bytes. The 16 bytes include a validity indicator and a pointer to a level one node 318 of a plurality of level one nodes in a level one 304.

As is known in the art, a SAN memory location can be expressed as an offset from SAN memory location zero (0). Using the BTree 300, and with the SAN having approximately 64 terabytes (TB) of storage, the level zero entry 308 corresponds to SAN memory locations at offsets of zero to four TB (one sixteenth of 64 TB). The next entry of the level zero 302 corresponds to SAN memory locations at offset of four TB to eight TB; the third entry of the level zero 302 corresponds to SAN memory locations at offset of eight TB to twelve TB; and the fourth entry of the level zero 302 corresponds to SAN memory locations at offset of twelve TB to sixteen TB, and so on (additional entries not depicted). Thus, the entirety of the memory locations in SAN (or other storage system 112) can be represented within the level zero 302.

Below the level zero 302 in the BTree 300, the level one 304 comprises a series of entries that each correspond to a narrower range of SAN memory locations than the entries at the level zero 302. Each entry within the level zero 302 has a corresponding node at the level one 304 (e.g., level zero entry 308 is the parent of level one node 318; not all nodes and entries are shown). The individual entries within the level one 304 include a validity indicator and a pointer to another entry in a level two 306. In some embodiments, each entry (e.g., level one entry 310) comprises sixteen bytes. The depicted node within the level one 304 comprises entries that collectively correspond to all of the SAN memory locations within level zero entry 308. Continuing the example above, the level zero entry 308 corresponds to SAN memory locations at offsets of zero to four TB. In one embodiment, to represent the entirety of this portion in the SAN (or other storage system 112), each entry in the nodes of level one 304 corresponds to 128 megabytes (MB) (one-thirty-two thousandth of 4 TB) and the level one 304 comprises four nodes, each potentially having 32,768 entries. Thus, the level one entry 310 corresponds to SAN offsets from zero to 128 MB, the next, offsets of 128 MB to 256 MB, the next, 256 MB to 384 MB, and so on until the entirety of the four TB is represented in a node within level one 304.

Below the level one 304 in the BTree 300, the level two 306 comprises a series of entries that each correspond to a narrower range of SAN memory locations than the entries at the level one 304. The entries within the shown level two node 320 collectively correspond to all of the SAN memory locations within level one entry 310. Each entry within level one 304 has a corresponding node at the level two 306 (not all nodes and entries are shown). Continuing the example above, the level one entry 310 can correspond to SAN memory locations at offsets of zero to 128 MB. In one embodiment, to represent the entirety of this portion in the SAN 112, each entry in the nodes of level two 306 corresponds to four kilobytes (kB) (one-thirty-two thousandth of 128 MB) of SAN memory. Thus the level two entry 312 corresponds to SAN offsets from zero to four kB, the next, offsets of 4 kB to 8 kB, the next, 8 kB to 12 kB, and so on until the entirety of the 128 MB is represented in a node within level two 306.

The storage cache 208 is organized in terms of buckets each representing, for example, 512 KB of cache memory. The exact size of the bucket can be chosen to be a value at which the underlying cache memory medium performs most efficiently. For example, an embodiment that operates on NAND flash devices as the cache memory medium uses the erase block size of the underlying flash device as the bucket size. Each entry in the level two 306 (e.g., level two entry 312) includes a bucket address that specifies a bucket 314 of the plurality of buckets in the storage cache 308 where the record stored at a SAN memory location is stored. Records stored at different SAN offsets can be stored in the same bucket 314. However, each entry in the level two 306 only includes one bucket address.

Figure 4:
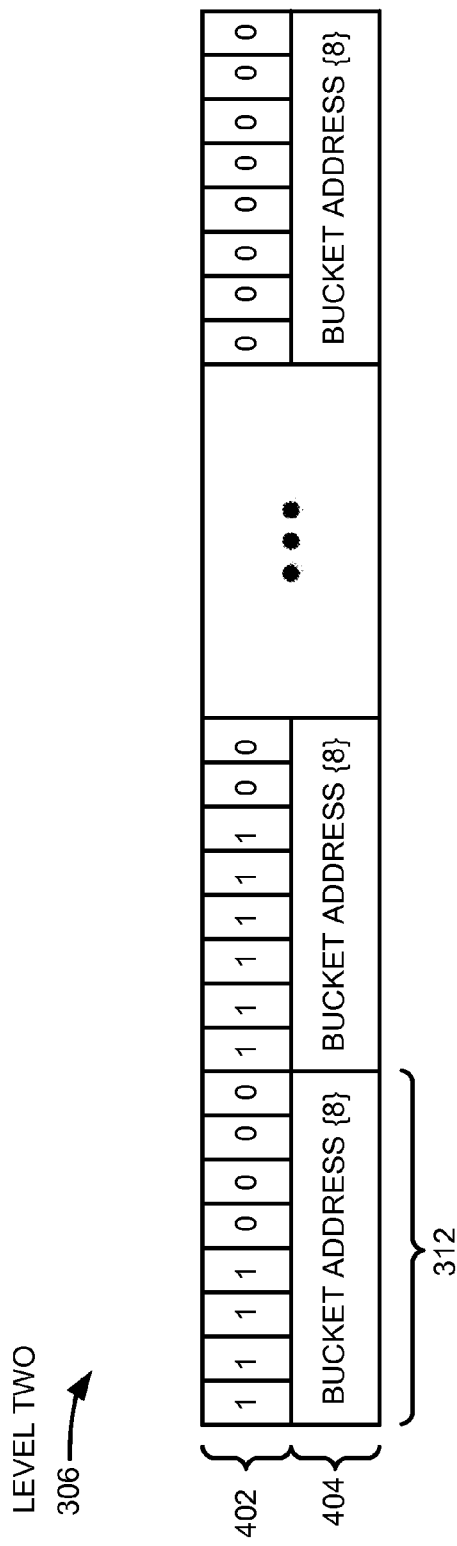
FIG. 4 is a diagram of a third level of the BTree, according to various embodiments.

FIG. 4 is a diagram of the level two 306 of the BTree 300, according to various embodiments. In some embodiments, each entry (e.g., level two entry 312) comprises sixteen bytes. A first portion of each level two entry 312 comprises a validity bitmap 402. The validity bitmap 402 indicates, for each further narrowed range of SAN memory locations of the level two entry 312, whether the whole record corresponding to that SAN memory location is stored in the cache memory 308 or only a part of the record is stored. Continuing the above example, where each level two entry corresponds to 4 kB of SAN address space, and where the validity bitmap 402 comprises 8 bits (as shown in FIG. 4), the further narrowed range comprises 512 bytes (i.e., 0.5 kB). Thus, in the entry 312 as shown in the figure, the storage cache 208 presently stores records corresponding to SAN offset addresses zero to two kB (the first four bits times 512 B per bit) and does not store records corresponding to SAN offset addresses from 2 kB up to 4 kB.

The second portion of the level two entry 312 of the BTree 300 comprises a bucket address 404. In the depicted embodiment, the level two entry 312 comprises only one bucket address. The bucket address is eight bytes and contains a bucket number, a bucket index, and a bucket generation number. The bucket number identifies a bucket 314 of the buckets 314 constructed within the storage cache 208 where the record having that SAN memory address is stored. The bucket index identifies a location within the bucket 314 where the record is stored. Because the buckets 314 can be significantly larger than individual records, multiple records at separate SAN offsets can be stored in the same bucket 314. In some instances, a bucket is 512 KB of cache memory. A generation number included in the bucket address indicates the generation number of the bucket 314 at the time the record was stored in the bucket 314. As will be discussed in connection with the bucket manager 204, the bucket generation number is used when determining if the contents of bucket 314 have been invalidated since the record was stored in the bucket 314.

Figure 5:
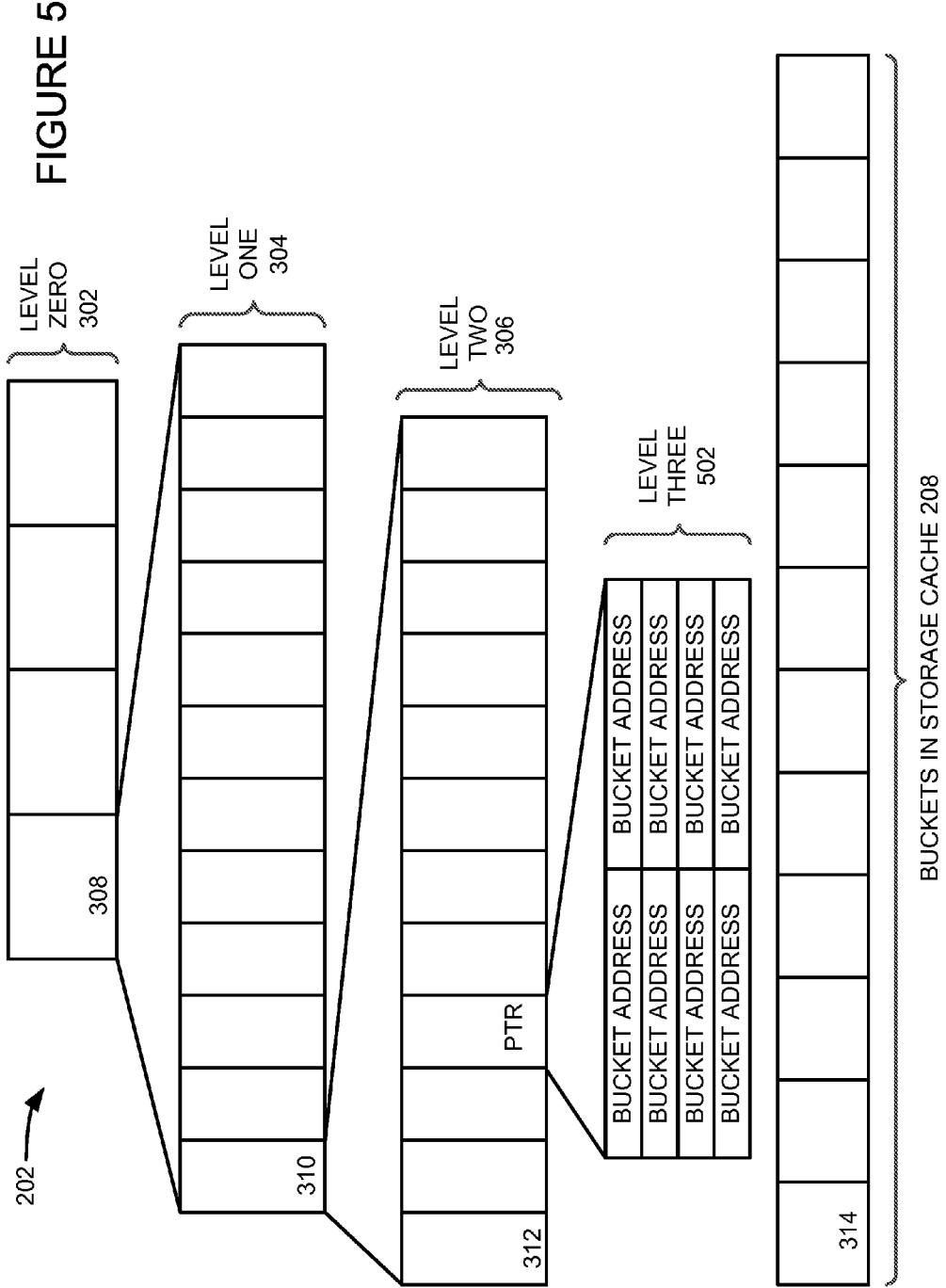
FIG. 5 is a diagram of the BTree having a further level, according to various embodiments.

FIG. 5 is a diagram of a BTree 300 having a further level, according to various embodiments. In some instances, IO commands can include records that are smaller than a level two entry 312 can address (in our example above, 4 kB). As would be understood by one of skill in the art, these records are referred to as unaligned IO commands because they may not align with 4 kB address boundaries. When two records are within the offsets specified by the same four kB level two entry 312, and are stored in separate buckets 314, the level two entry 312 cannot accommodate both bucket addresses 404. As such, a further level three entry 502 is added to the BTree 300. The level three entry 502 corresponds to four kB of space in the storage system 112 (e.g., a SAN) like the level two entry 312. However, a level three entry 502 is much larger than a level two entry 312 because it can address parts of the four kB address space as independent segments, as described below. In one embodiment, the level three entry 502 can contain up to eight bucket addresses 404. The level three entry 502 further comprises a level three entry generation number that is used when determining if the bucket 314 has been evicted since the record included in the unaligned IO command was stored in the bucket 314 and a pin count, which is described elsewhere herein.

Figure 6:
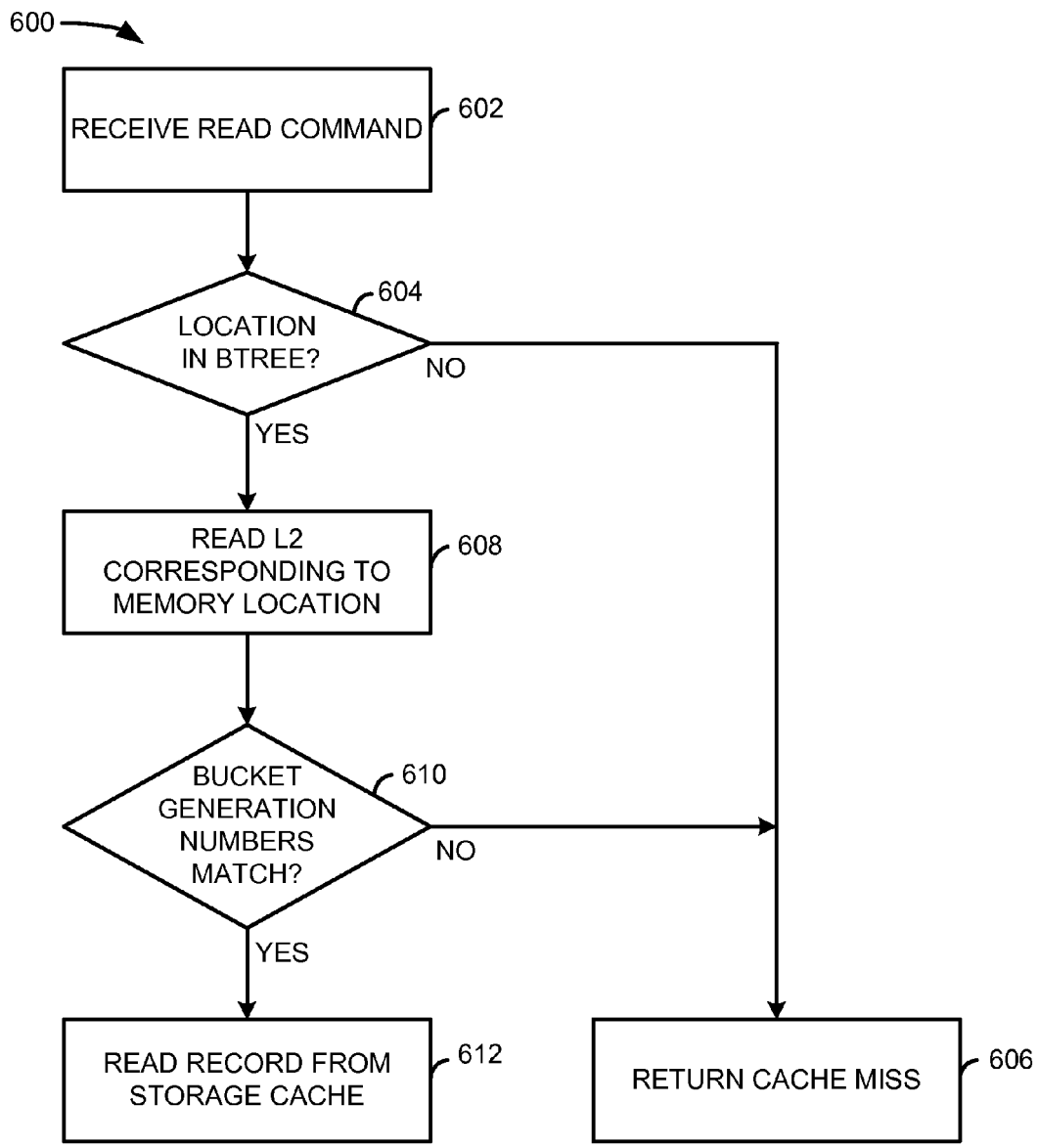
FIG. 6 is a flowchart of a method of executing a read command, according to various embodiments.

When a read command is received, the BTree 300 is used to determine if the record of the read command specified by a SAN memory location is stored in the storage cache 208. If the record is stored in the storage cache 208, the BTree 300 identifies a bucket 314 in the cache storage 208 where the record is stored. FIG. 6 is a flowchart of a method 600 of executing a read command, according to various embodiments. The method 600 can be performed by the bucket manager 204 in connection with the BTree 300 and the storage cache 208. As will be explained, the metadata manager 206 is configured to traverse the BTree 300.

In an operation 602, a read command sent from the virtual machine 102 to the host operating system 106 is received by the caching system 110. In embodiments where the storage system 112 comprises a SAN, the read command specifies the record to be read by a SAN memory location (e.g., a SAN offset address), and a length of data to be read. The read command also indicates a buffer where the record is to be written to.

Figure 7:
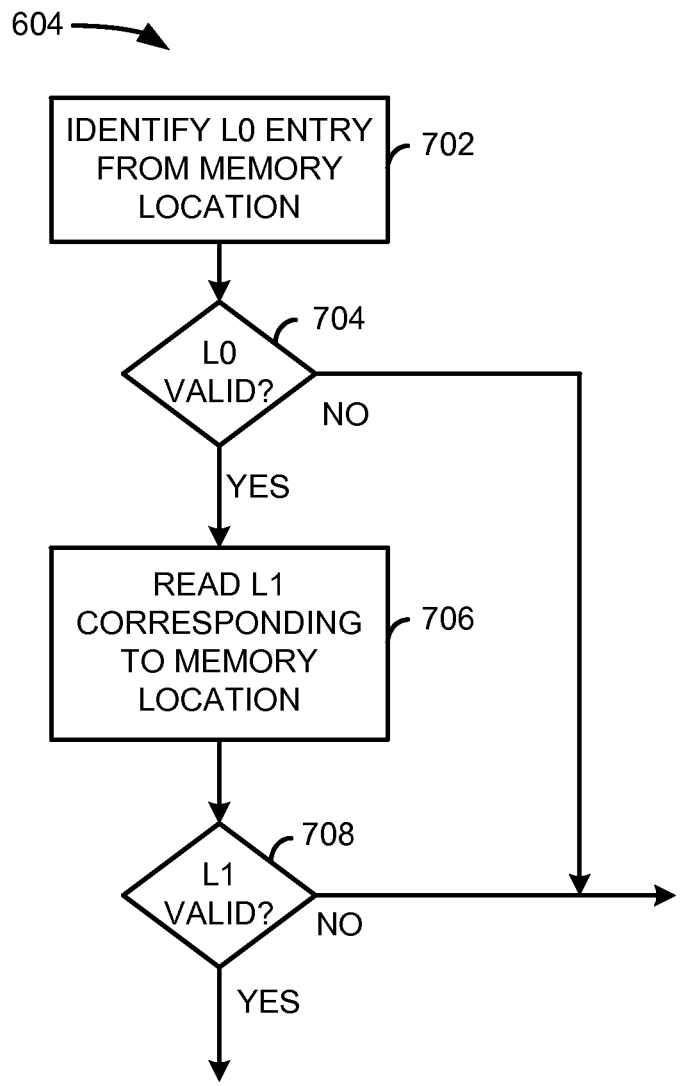
FIG. 7 is a flowchart of a method of traversing the BTree, according to various embodiments.

In an operation 604, a determination is made by, for example, the metadata manager 206, whether the record has been cached for the SAN memory location. To determine whether the record stored at the SAN memory location is cached, the cache index 202 (e.g., BTree 300) is traversed by the metadata manager 206. The traversal of the cache index 202 returns a cache miss or a bucket address of the cached record. FIG. 7 is a flowchart of a method 604 of traversing a BTree 300, according to various embodiments.

In an operation 702, the SAN offset address (or memory address of the storage system 112) included in the read command is used to identify a corresponding entry (e.g., level zero entry 308) in the level zero (L0) 302 of the BTree 300. The metadata manager 206, in an operation 704, determines whether the level zero entry 308 is valid. The level zero entry 308 is valid if at least one record has been stored in the range of SAN memory locations covered by the level zero entry 308. If no records have been stored in that range of SAN memory locations, the offset is not cached in the BTree 300 and the level zero entry is not valid.

If the level zero entry 308 is valid, the method 604 continues to operation 706. In the operation 706, the metadata manager reads the level one (L1) entry (e.g., the level one entry 310) corresponding to the received SAN offset address. The metadata manager 206 then determines, in an operation 708, whether the level one entry 310 is valid. Like the determination in the operation 704, the level one entry is valid if records have been stored in the corresponding portion of the SAN. If no records have been stored in that portion of the SAN, the offset is not cached in the BTree 300 and the level one entry 310 is not valid. If the level one entry 310 is valid, the method 604 returns a "yes", indicating that the SAN offset is cached in the BTree 300.

Returning to FIG. 6, if the outcome of the determination in operation 604 is that the SAN offset is not cached in the cache index 202, a cache miss is returned in an operation 606. If, however, the outcome of the determination in the operation 604 is that the offset is cached in the cache index 202, the bucket manager 204 reads the level two entry 312 of the cache index 202 corresponding to the SAN memory address, in the operation 608. As part of the operation 608, the bucket manager 204 further determines the location in the storage cache 208 where the record is stored from the bucket address 404. While not shown, at the operation 608, the method 600 can return a cache miss (operation 606) if, for example, the validity bitmap 402 indicates that the contents at the SAN memory location are not stored in the storage cache 208 or if the level two entry 312 does not contain a bucket address 404.

In an operation 610, bucket generation numbers are compared to determine if there is a match. As explained with respect to FIG. 4, the bucket address 404 included in the cache index 202 includes a bucket generation number indicating the generation of the bucket 314 at the time the record was stored in the bucket 314. The bucket manager 204 stores a current bucket generation number as part of the eviction process described elsewhere herein. If the bucket generation number stored in the cache index 202 does not match the current bucket generation number stored by the bucket manager 204, a cache miss is returned in operation 606. If the generation numbers do match, in an operation 612, the bucket manager 204 reads the record identified in the read command from the storage cache 208.

Figure 8:
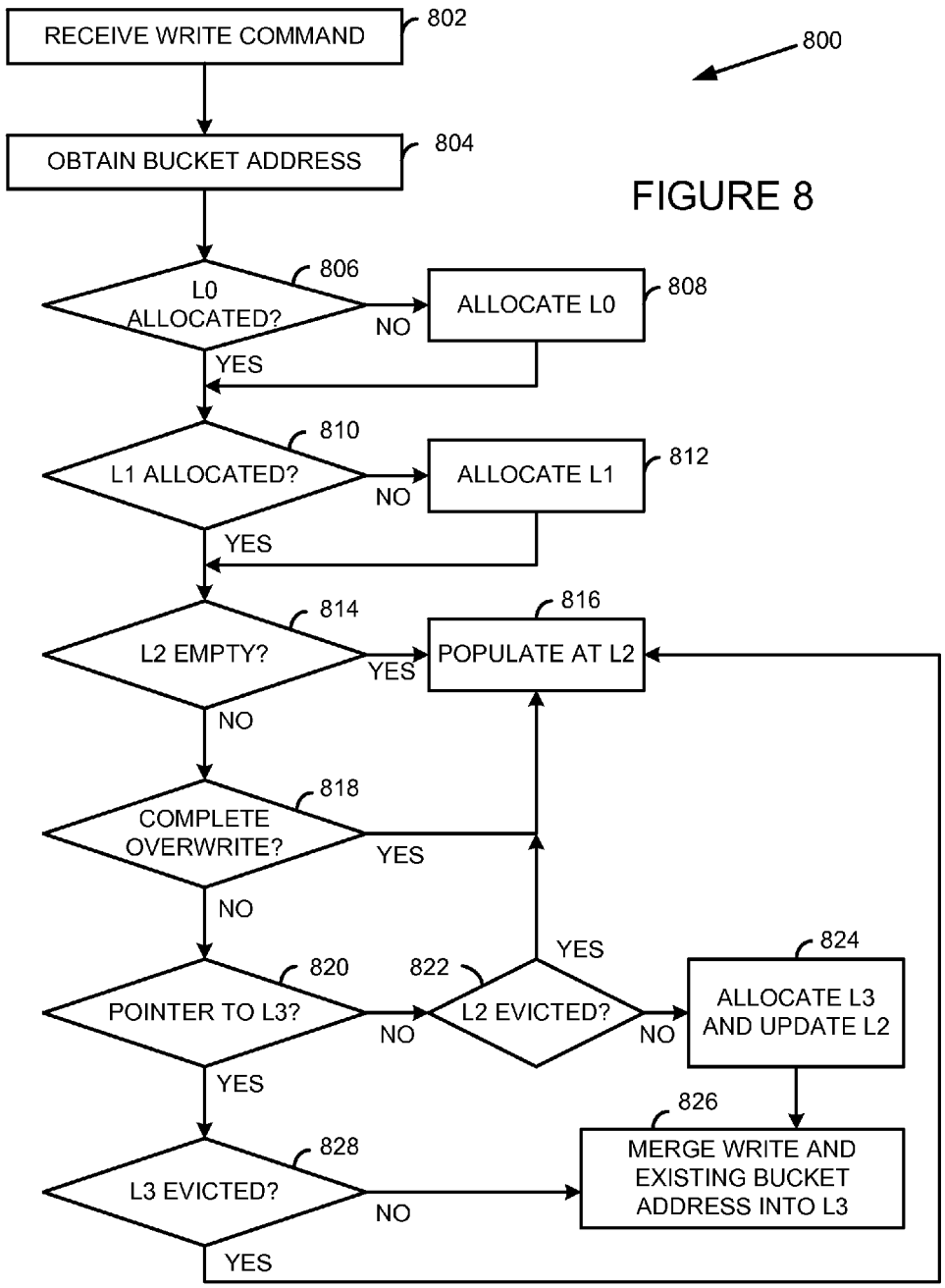
FIG. 8 is a flowchart of a method of executing a write command, according to various embodiments.

FIG. 8 is a flowchart of a method 800 of executing a write command, according to various embodiments. The method 800 is performed by the caching system 110, and, more specifically by the bucket manager 204 and the metadata manager 206.

In an operation 802, a write command is received from the virtual machine 102 by the caching system 110. In embodiments where the storage system 112 comprises a SAN, the write command comprises a SAN memory location where a record is to be stored, a length of the record, and the record to be stored.

In an operation 804, a bucket address 404 where the record is stored in the storage cache 208 is obtained from the bucket manager 204. The operation 804 is described in greater detail in connection with FIG. 10.

In an operation 806, the metadata manager 206 determines whether the level zero entry (e.g., level zero entry 308) corresponding to the SAN memory location is allocated (i.e., valid) in the cache index 202. If the L0 entry 308 is not allocated, the metadata manager 208 allocates the L0 entry 308 in an operation 808.

Once the L0 entry 308 is allocated or validated, the metadata manager 206 determines whether the level one entry (e.g., level one entry 310) corresponding to the SAN memory location is allocated in the cache index 202, in an operation 810. If the level one entry 310 is not allocated, the metadata manager 206 allocates the level one entry 310 in an operation 812.

In an operation 814, the metadata manager 814 determines whether the level two entry (e.g., level two entry 312) corresponding to the SAN memory location included in the write command is empty, and thus available. If the level two entry 312 is empty, the metadata manager 206, in an operation 816, populates the obtained bucket address 404 of the operation 804 at the level two entry 312. In this operation 816, the metadata manager 206 further updates the validity bitmap 402 of the level two entry 312 to indicate the SAN memory location of the record.

If the outcome of the determination operation 814 is that the level two entry 312 is not empty, in an operation 818, the metadata manager 206 determines whether the record included in the write command of the operation 802 has completely overwritten the existing level two entry 312. If so, the obtained bucket address 404 is populated at the level two entry 312 and the validity bitmap 402 is updated in the operation 816.

If the outcome of the determination operation 818 is that the record included in the write command of the operation 802 did not completely overwrite the existing level two entry 312, the received record can be an unaligned IO command having a size of less than four kB. In this case, the metadata manager 206 determines whether the level two entry 312 contains a pointer to a level three entry 502 in an operation 820.

If the outcome of the determination operation 820 is that there is no pointer to a level three entry 502, the metadata manager 206 determines whether the level two entry 312 is evicted in an operation 822. Eviction is discussed below, at least in connection with FIG. 10. Similar to the operation 610, the metadata manager 206 determines whether the generation number in the bucket address 404 obtained in the operation 804 from the bucket manager 204 matches a generation number in the bucket address 404 stored in the cache index 202. If the generation numbers do not match, the level two entry 312 is evicted. The metadata manager 206 populates the obtained bucket address 404 of the operation 804 at the level two entry 312 and updates the validity bitmap 402 in the operation 816.

In an operation 824, if the outcome of the determination operation 822 is that the level two entry 312 is not evicted, the metadata manager 206 allocates a level three entry 502 to accommodate the unaligned IO command in an operation 824. In this operation 824, the metadata manager 206 updates the level two entry 312 to include a pointer to the level three entry 502.

In an operation 826, the metadata manager 206 merges the bucket address obtained in the operation 804 and the existing bucket address in the level two entry 312 to the allocated level three entry 502. Thus, the level three entry 502 can store two or more bucket addresses 404 indicating where each unaligned IO command is stored.

Returning to the operation 820, if the determination made is that there is an existing pointer to the level three entry 502 in the level two entry 312, in an operation 828, the metadata manager 206 determines if the level three entry 502 has been evicted by comparing the generation numbers in the bucket addresses 404 stored in the level three entry 502 to the generation numbers in the bucket addresses 404 maintained by the bucket manager 204. If the generation numbers do not match, the buckets in the level three entry 502 have been evicted and the operation 816 is performed.

If, however, the determination made in the operation 828 is that the level three entry 312 has not been evicted, the metadata manager 206 performs operation 826 where the bucket address 404 obtained in the operation 804 is merged with the existing bucket address 404 into the level three entry 502.

Figure 9:
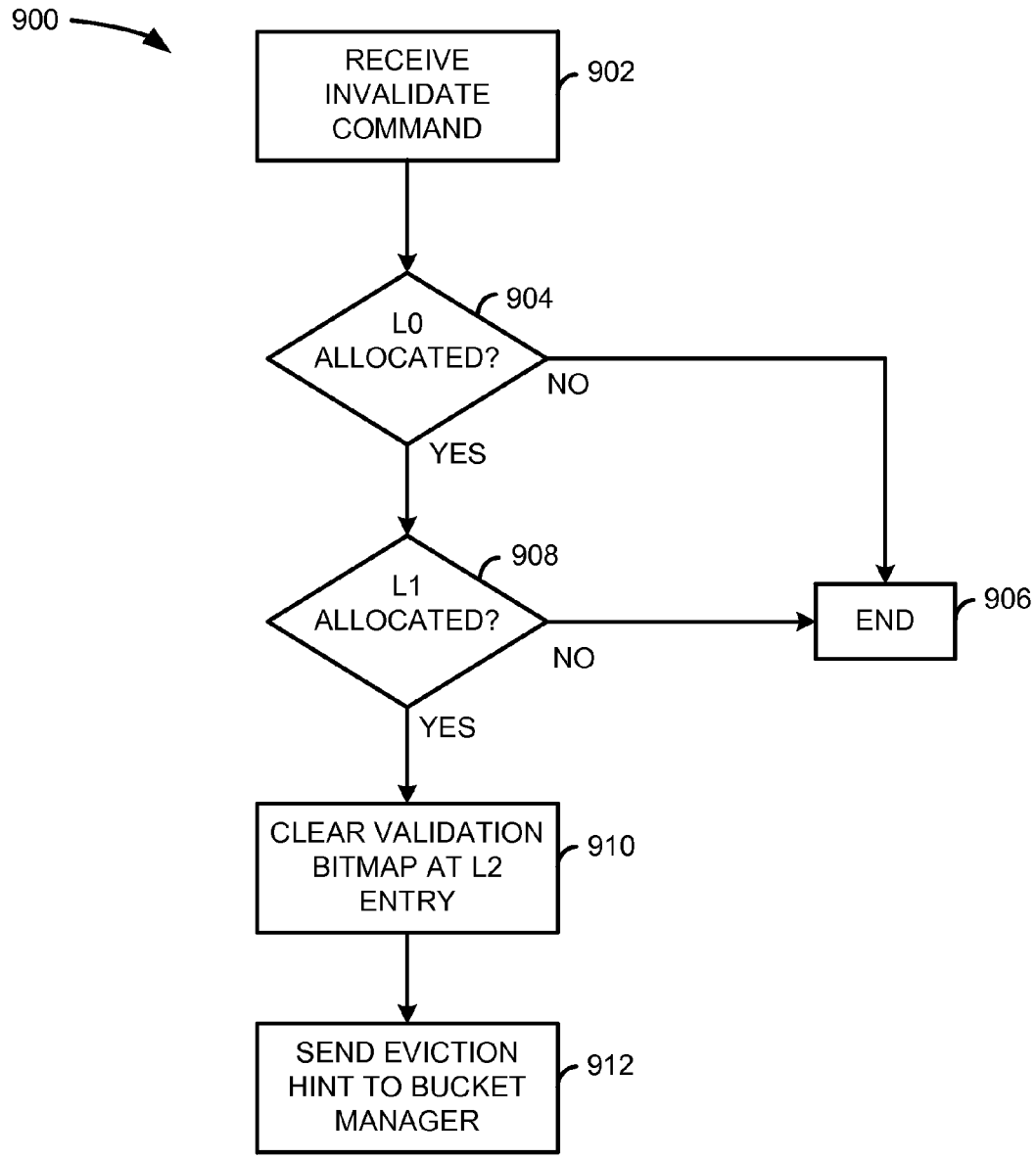
FIG. 9 is a flowchart of a method of executing an invalidate command, according to various embodiments.

FIG. 9 is a flowchart of a method 900 of executing an invalidate command, according to various embodiments. An invalidate command is a command like the read command and the write command. The invalidate command tells the caching system 110 to no longer read a record stored in the storage cache and includes a memory address of the storage system 112 (e.g., a SAN memory location) and length of the record to be invalidated. The discussion of FIG. 9 describes an embodiment where the storage system 112 comprises a SAN.

In an operation 902, the metadata manager 206 receives an invalidate command from the virtual machine 102 identifying a SAN memory location (e.g., SAN offset address) to be invalidated.

If the higher level entries are not allocated in the BTree 300 for the SAN memory address included in the invalidate command, the BTree 300 does not store a bucket address for the SAN memory location. In an operation 904, the metadata manager 206 determines whether the level zero entry 308 corresponding to the SAN memory address included in the invalidate command is allocated. If not, the process 900 ends in an operation 906. Otherwise, in an operation 908, the metadata manager 206 determines whether the level one entry 310 corresponding to the SAN memory address included in the invalidate command is allocated. If not, the process 900 ends in an operation 906.

Otherwise, in an operation 910, the metadata manager 206 identifies the level two entry 312 corresponding to the SAN memory location included in the invalidate command of the operation 902 and clears the validation bitmap 402 of the level two entry 312 by setting all of the values to zero.

In an operation 912, the metadata manager 906 sends an eviction hint to the bucket manager 204. The eviction hint identifies the bucket address 404 included in the level two entry 312 and indicates to the bucket manager 204 that the bucket manager 204 can evict the bucket 314.

Figure 10:
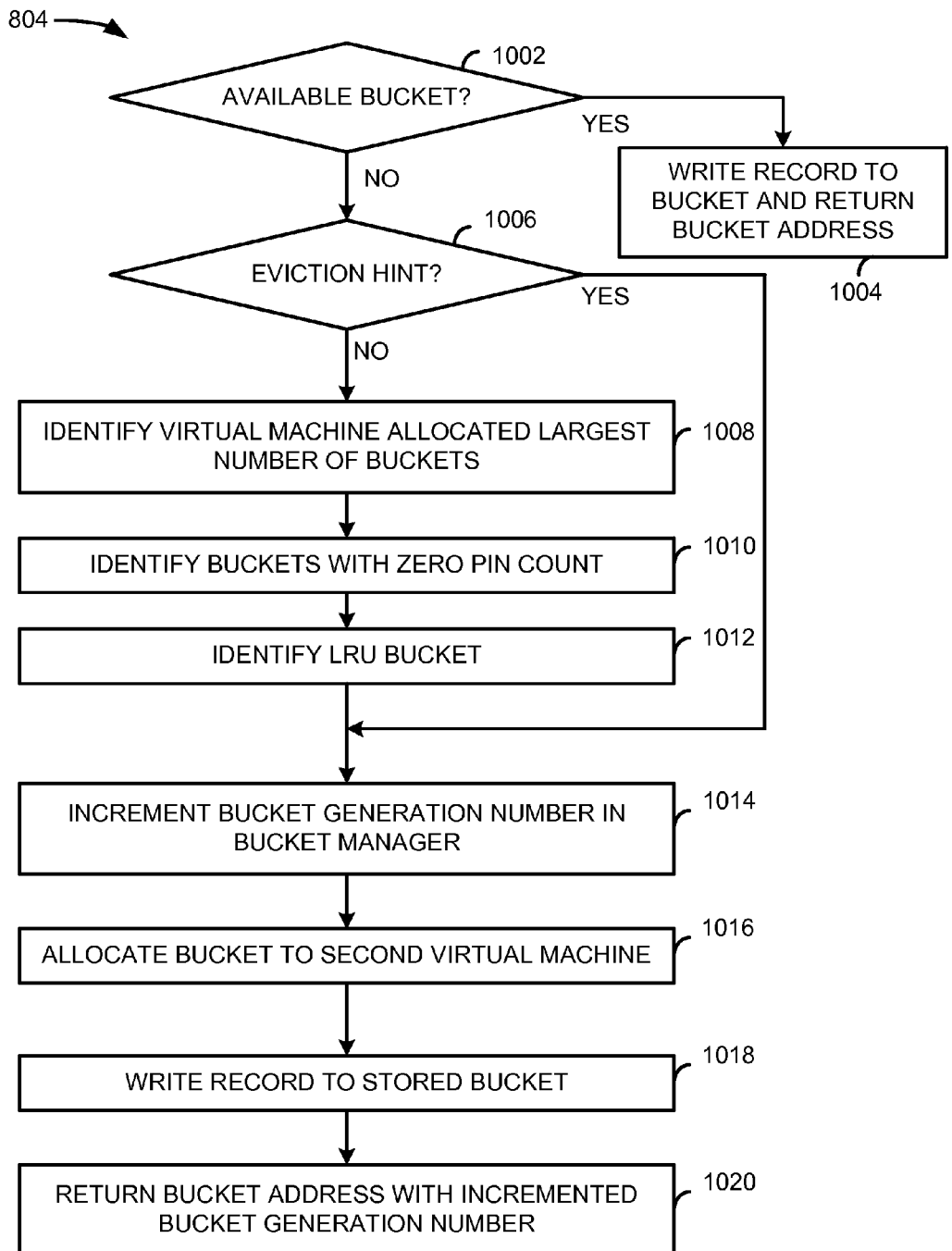
FIG. 10 is a flowchart of a method of evicting a bucket and returning a bucket address according to various embodiments

Eviction is the process by which buckets in the storage cache 908 can be marked as free for subsequent reuse. FIG. 10 is a flowchart of a method 804 of evicting a bucket 314 and returning a bucket address 404 according to various embodiments. The method 804 can be performed by the bucket manager 204 and, in an embodiment, is initiated when a write command is received from the virtual machine 102.

In an operation 1002, the bucket manager 204 determines whether there is a bucket 314 allocated to the virtual machine 102 from which the write command was received and having available space to store the record included in the received write command. If there is a bucket 314 available, in an operation 1004, the bucket manager 204 writes the record included in the write command to the available bucket 314 and returns the bucket address 404 where the record was written to the metadata manager 206.

In an operation 1006, if there is no available bucket 314, the bucket manager 204 determines if an eviction hint has been received from the metadata manager 206 as described in connection with FIG. 9. If an eviction hint has been received, the method 804 skips ahead to the operation 1014, discussed below.

In an operation 1008, if no eviction hint has been received, the bucket manager 204 identifies which virtual machine has the largest number of buckets 314 allocated to it. The bucket manager 204 determines a number of buckets 314 allocated to each virtual machine 102 in the environment 100. As discussed above, by being allocated to a virtual machine 102, the individual buckets 314 contain records sent by only one virtual machine 102. A bucket descriptor array of the bucket identifies the virtual machine to which the bucket is allocated.

In an operation 1010, the buckets 314 allocated to the identified virtual machine 102 are evaluated so as to identify buckets 314 having all of their stored records sent to the storage system 112. This is accomplished by the bucket manager 204 checking a pin count of the bucket 314. The pin count is a value stored in a bucket descriptor array that indicates how many records stored in the bucket 314 have not yet been written to the storage system 112. When a record is written to the bucket 314, and before it is included in a write command sent to the storage system 112, the pin count is incremented by the bucket manager 204. After the record in the bucket 314 is retrieved and included in a write command sent to the storage system 112, thus writing back the record, the pin count is decremented by the bucket manager 204. When a bucket 314 includes multiple records (which can be at distinct memory locations in the storage system 112), the pin count can be of a value up to the number of records in the bucket 314. As the records in the bucket 314 are written back to the storage system 112, the pin count is decremented by the bucket manager 204. A zero pin count indicates that the records stored in the bucket 314 are stored in the storage system 112.

In an operation 1012, if more than one bucket 314 allocated to the identified virtual machine 102 has a zero pin count, a least recently used (LRU) bucket is identified. An LRU bucket is a bucket 314 that has been not been written to or read from more recently than other buckets 314 allocated to the virtual machine 102. In an embodiment, the LRU bucket is selected for eviction.

It is to be understood that, by identifying a bucket to be evicted based on the determinations 1008 and 1012, buckets 314 can be more evenly balanced among the virtual machines 102.

In an operation 1014, based on the eviction hint of the operation 1006 or the LRU bucket identified in the operation 1012, the bucket manager 204 evicts the bucket 314. To evict the bucket 314, the bucket manager 204 increments a bucket generation number included in the bucket address 404 maintained by the bucket manager 204. The bucket manager 204 does not update or increment any bucket generation numbers in the bucket addresses 404 stored in the cache index 202. In this way, eviction is handled independently of the cache index 202. Thus, when reading from, or writing to, the storage cache 208, the bucket generation number in the bucket address 404 stored in the cache index 202 is compared to the bucket generation number stored by the bucket manager 204 (see, e.g., operation 610, operation 822, and operation 828) to ensure that the record is not stale and can be retrieved from the cache storage 208 rather than the storage system 112.

In an operation 1016, the evicted bucket 314 is allocated to the virtual machine 102 that sent the write command by the bucket manager 204 by writing a virtual machine identifier to the bucket descriptor array. In an operation 1018, the record is stored in the evicted bucket 314 by the bucket manager 204. In an operation 1020, the bucket address 404, with the incremented bucket generation number, is returned by the bucket manager 204 to the metadata manager 206.

Using the described systems and methods, records sent from a virtual machine 102 to a host operating system 106 are cached. A cache index 202 is used to determine a bucket 314 in the storage cache 208 where the record is cached based on a memory location of the storage system included in a read command. To write records to the storage cache 208, the record is stored in a bucket 314 and the cache index 202 is updated to include the bucket address 404. Unaligned IO commands can be accommodated in the cache index 202 by expanding the cache index to include a further level. Buckets 314 can be evicted by the bucket manager 204 independently of the cache index 202 or the metadata manager 206, resulting in more efficient eviction.

Figure 11:
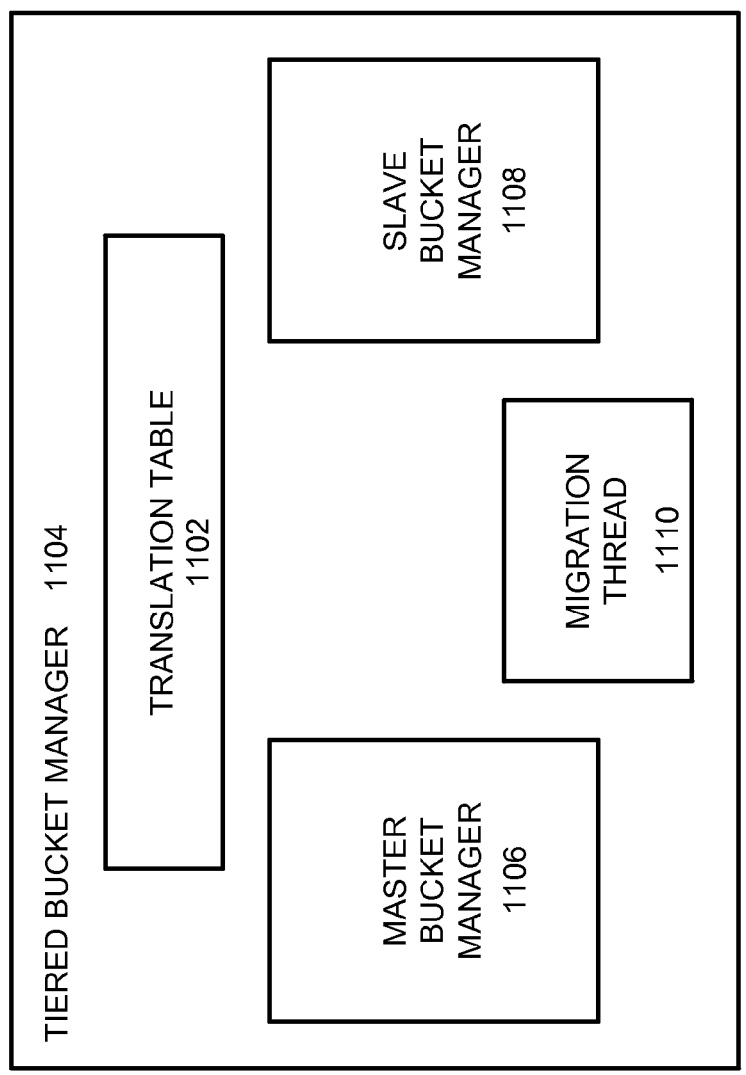
FIG. 11 is a block diagram of one embodiment of a tiered bucket manager

In a further embodiment, the bucket manager operates in a tiered fashion as will now be explained. Referring now to FIG. 11, a tiered bucket manager 1104 can be seen which, from an external perspective (e.g., application programming interface or API), appears the same as non-tiered bucket manager 204 of FIG. 2 thereby avoiding having to make any changes to components outside the bucket manager. To accomplish this, tiered bucket manager 1104 includes additional components and logic to facilitate a tiered approach. In particular, tiered bucket manager 1104 includes a translation table 1102, a master bucket manager 1106, a slave bucket manager 1108, and a migration thread 1110.

In many respects, master bucket manager 1106 of tiered bucket manager 1104 functions the same as non-tiered bucket manager 204 by transforming a bucket manager address (again, consisting of a bucket number and a generation number) into a flash or memory address of the cache, as well as performing write and eviction operations. However, rather than evicting data to long term storage, instead master bucket master 1106 migrates cached data to slave bucket manager 1108 (hence the term "tiered"). Further, such migrated cached data goes through a filter function performed by migration thread 1110. In turn, slave bucket manager 1108 also functions in much the same way as non-tiered bucket manager 204 by transforming a bucket manager address (consisting of a bucket number, a generation number, and a length) into a flash or memory address of the cache, as well as performing eviction operations. Translation table 1102 keeps track of migrated cached data. Each of these functions and operations are explained further elsewhere herein.

Such a tiered approach has a number of potential advantages and use cases. One example is using data compression as the filter function, which can be useful when master bucket manager 1106 is implemented in a faster, likely more expensive form of memory than slave bucket manager 1108. Such an approach keeps more actively accessed data (referred to herein as "hot") in master bucket manager 1106, less actively accessed data (referred to herein as "warm") in slave bucket manager 1108 and evicts least actively accessed data (referred to herein "cold"). Another example is using data encryption as the filter function, which can be useful when master bucket manager 1106 is implemented in a more secure, likely more expensive hardware than slave bucket manager 1108. It is to be understood that any combination of memory types can be used for master bucket manager 1106 and slave bucket manager 1108 and that any filter function (including a filter function that makes no change to the cached data being migrated between master bucket manager 1106 and slave bucket manager 1108) can be used by migration thread 1110 to migrate cached data as desired in a given implementation.

It is to be further appreciated that because the tiered bucket manager approach provides the same interface as the previously described non-tiered bucket manager approach, the filter function (e.g., compression) does not affect and is hidden from other system components such as the cache index (e.g., the BTree) and therefore there is minimal impact related to updating the BTree caused by this tiered bucket manager approach. Stated differently, the remapping of bucket addresses caused by data migration from master bucket manager to slave bucket manager and from slave bucket manager back to master bucket manager all happens within the tiered bucket manager (and therefore at a lower level of data granularity) so there is no I/O needed to update the BTree which would be a more expensive process because that would require updating things in multiple places in the BTree.

Figure 12:
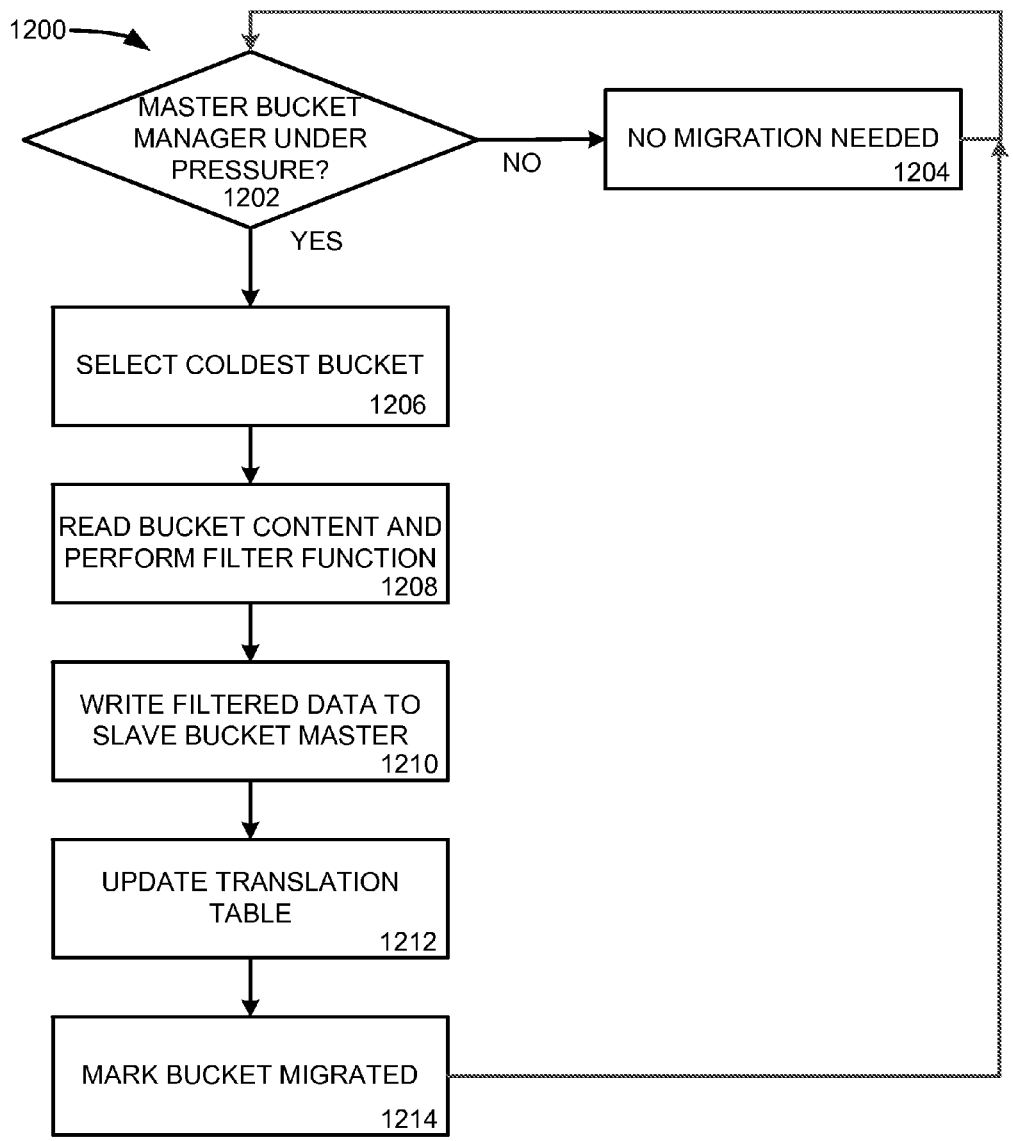
FIG. 12 is a flowchart of a method of migrating cached data from a master bucket manager to a slave bucket manager.
Figure 13:
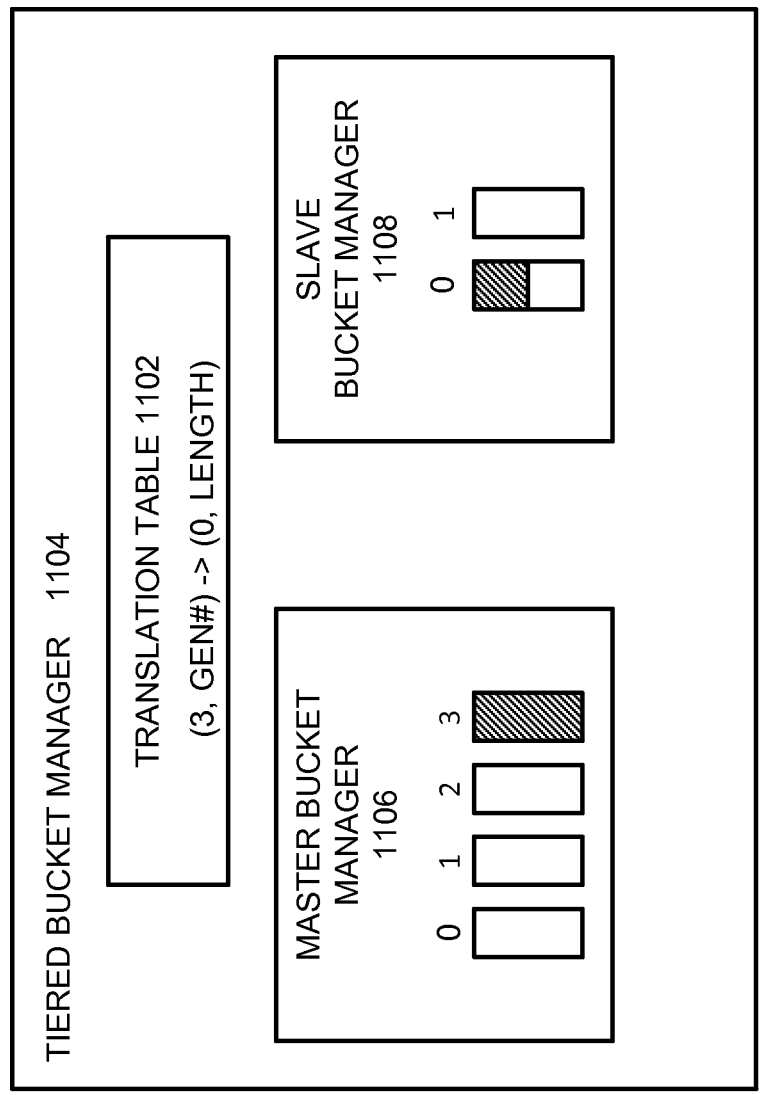
FIG. 13 is a block diagram of one embodiment of a tiered bucket manager migrating cached data from a master bucket manager to a slave bucket manager.

The process of migration thread 1110 migrating cached data from master bucket manager 1106 to slave bucket manager 1108 will now be explained. Referring now to FIGS. 12 and 13, migration process 1200 begins with making a determination, in step 1202, regarding whether master bucket manager 1106 is under pressure. In a preferred embodiment, master bucket manager 1106 is deemed to be under pressure when it is full and those buckets that have been migrated to the slave bucket master 1108 is below a configurable threshold. The configurable threshold is set to a value (e.g., 2% of the master bucket manager size, in one embodiment) that attempts to keep a small number of migrated buckets in the master bucket manager so that when the master bucket manager needs to evict buckets it can do so by evicting a migrated bucket. If master bucket manager 1106 is not under pressure then, in step 1204, no data migration is needed and the process returns to step 1202. However, if master bucket manager 1106 is under pressure then, in step 1206, the coldest bucket in master bucket manager 1106 is selected. In an embodiment, this is performed by migration thread 1110 calling the eviction algorithm of master bucket manager 1106 to request that it identify the coldest bucket in master bucket manager 1106 using any known eviction approach (e.g., FIFO, LIFO, LRU, etc.). In the example of FIG. 13, bucket 3 is the coldest bucket in master bucket manager 1106.

Once the coldest bucket in master bucket manager 1106 is selected then, in step 1208, the contents of that bucket are read and the filter function (e.g., compression) is performed on that read data. In the example of FIG. 13, the contents of bucket 3, the coldest bucket in master bucket manager 1106, are read and compressed. The filtered (e.g., compressed) data is then written to slave bucket manager 1108 (which may itself trigger an eviction within slave bucket manager 1108, as explained elsewhere herein), in step 1210, and translation table 1102 is updated to reflect this data migration so that future read requests sent to tiered bucket manager 1104 will be able to locate and return the requested cached data (as explained elsewhere herein), in step 1212, and the coldest bucket in master bucket manager 1106 is marked as migrated in master bucket manager 1106.

In the example of FIG. 13, the compressed contents of bucket 3 have been written to bucket 0 of slave bucket manager 1108. In this example, as shown in FIG. 13, where the bucket sizes of master bucket manager 1106 and slave bucket manager 1108 are each 512 kilobytes (kB), the data contents had filled bucket 3 of master slave manager 1106 yet do not fill bucket 0 of slave bucket manager 1108 due to the data being compressed from, in this example, 512 kB down to 100 kB, according to the filter function before being stored in slave bucket manager 1108. Further, translation table 1102 is updated to reflect this data migration from master bucket manager 1106 to slave bucket manager 1108 by storing a translation from bucket 3's address (and generation number) of master bucket manager 1106 to bucket 0's address (with a length of the stored compressed data content) of slave bucket manager 1108.

The process then returns to step 1202 to again make a determination regarding whether master bucket manager 1106 is under pressure.

Figure 14:
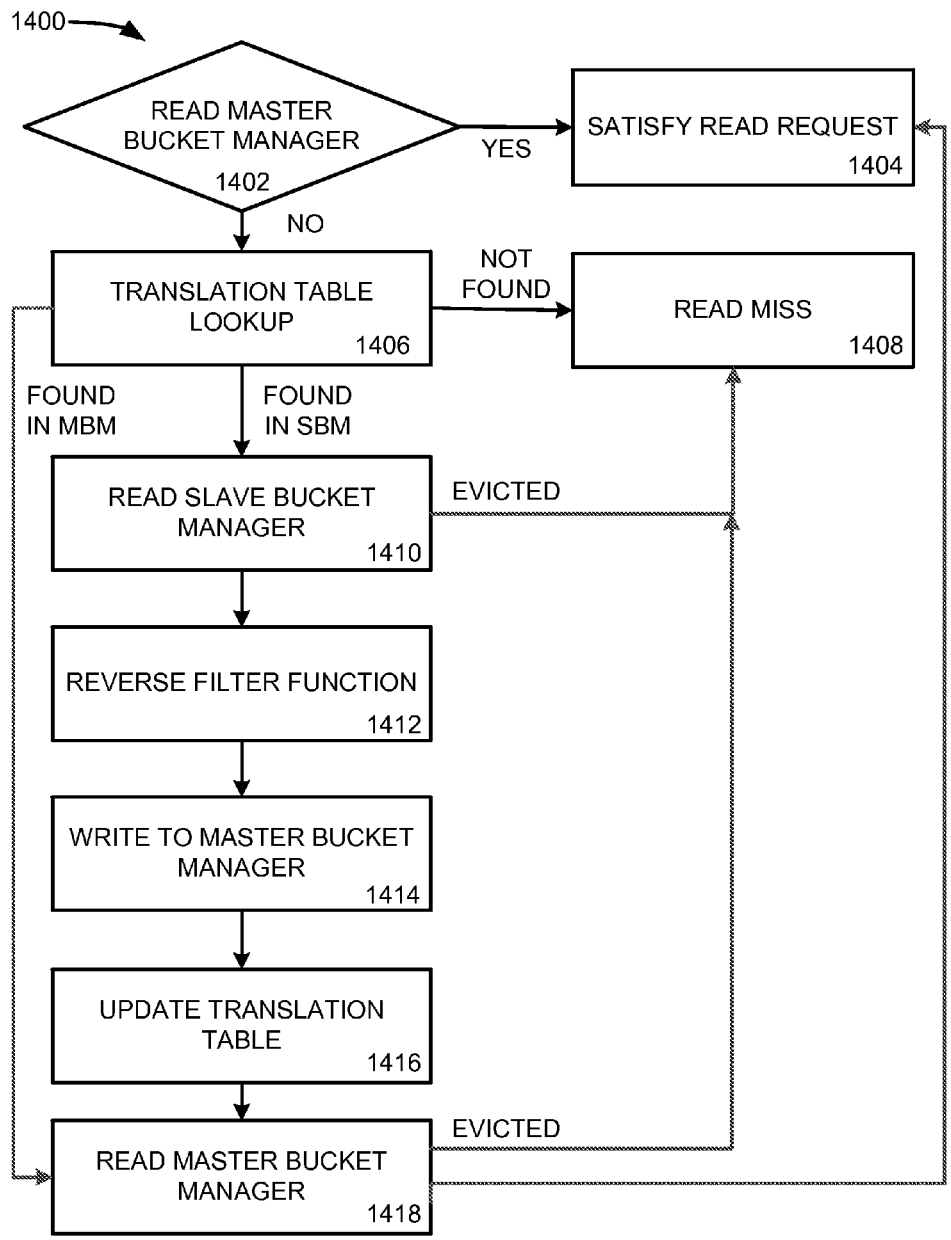
FIG. 14 is a flowchart of a method of reading cached data using a tiered bucket manager.

Read operations using tiered bucket manager 1104 will now be explained. Referring now to FIG. 14, read process 1400 begins with tiered bucket manager 1104 receiving a request from the cache index for cached data, in this example a read of bucket address 10 with a generation number of 8. In step 1402, a determination is made regarding whether master bucket manager 1106 contains the requested data (i.e., in this example, does data stored in bucket address 10 contain data with a generation number of 8?). If it does, then the read request is satisfied in step 1404 by returning the data from bucket address 10. Alternatively, if the requested data has been evicted (in which case the generation number does not match the read request) or migrated (in which case, in this example, bucket address 10 is marked in master bucket manager 1106 as being migrated) from master bucket manager 1106 then the process continues with step 1406 where a lookup is performed on translation table 1102. If this lookup results in not finding the requested data (that is, in this example, there is no bucket address 10 in translation table 1104) then a read miss operation is performed in step 1408. If this lookup results in finding the requested data in slave bucket manager 1108 (that is, in this example, bucket address 10 with generation number 8 is found in translation table 1104 with a pointer to bucket 0, generation number 6, and with length 100 kB) then the process continues with step 1410 where a read of slave bucket manager 1108 is performed using the slave bucket address and length. If the read of slave bucket manager 1108 cannot be performed because the data has been evicted from slave bucket manager 1108 (e.g., the generation number stored in translation table 1104 for bucket 0 in slave bucket manager 1108 does not match the read request) then a read miss operation is performed in step 1408. Alternatively, if the read of slave bucket manager 1108 can be performed then, in step 1412, the read data is put through a reverse filter function (e.g., decompression) to return the filtered data back into its original unfiltered state. The original (i.e., reverse filter function) data is then written to the master bucket manager in step 1414, as explained elsewhere herein, and the translation table is updated to reflect this reverse migration of data from slave bucket manager 1108 to master bucket manager 1106 (e.g., by updating the translation table to now point to bucket 5 in master bucket manager 1106). The data is then read, in step 1418, from master bucket manager 1106 (e.g., from bucket 5 of master bucket manager 1106), unless it has since been evicted (as evidenced by a failure to match requested generation number) in which case a read miss is returned in step 1408, and the read request is then satisfied in step 1404. Returning to step 1406, if the lookup results in finding the data in master bucket manager 1106 (because the requested data was previously reverse migrated from slave bucket manager 1108 to master bucket manager 1106 according to the process described herein), then the process continues with step 1418 as has been explained.

As should now be clear, read operations first attempt to read cached data from master bucket manager 1106 and, failing that, attempt to locate the requested data from slave bucket manager 1108 and if found there, via translation table 1102 and due to an earlier migration operation, the migrated data is reverse filtered and moved back to master bucket manager 1106 from slave bucket manager 1108 and an update is made to translation table 1102 to reflect this reverse migration so that the data can be located in and obtained from master bucket manager 1106. Further, as also explained, generation numbers are likewise maintained to ensure the data is current.

Figure 15:
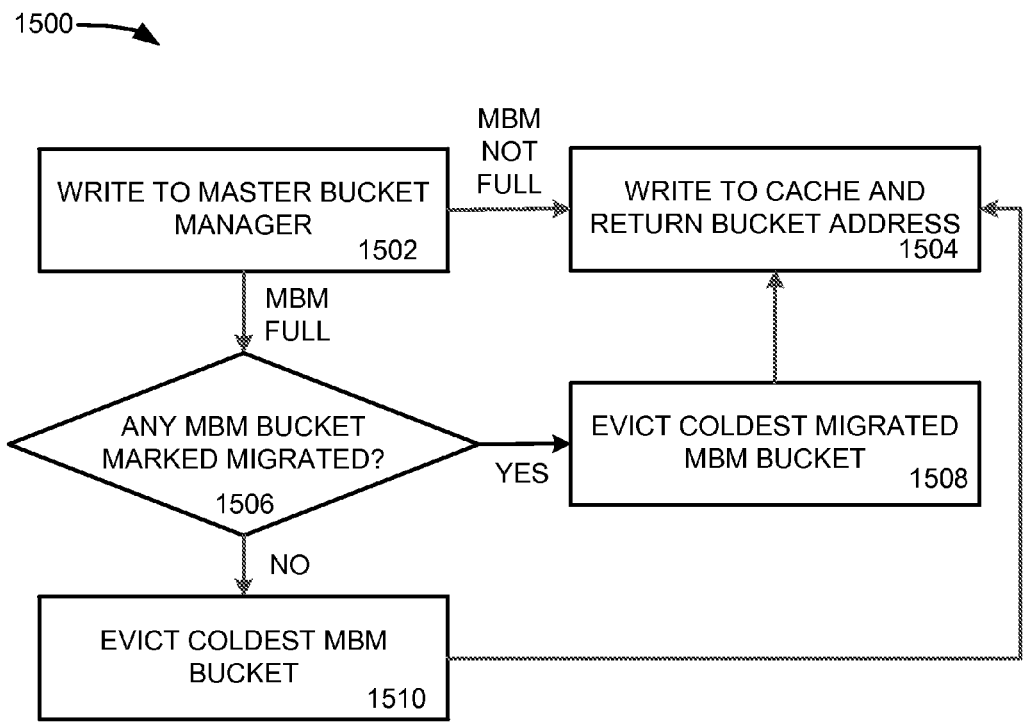
FIG. 15 is a flowchart of a method writing cached data using a tiered bucket manager.

Write operations using tiered bucket manager 1104 will now be explained. Referring now to FIG. 15, write process 1500 begins with tiered bucket manager 1104 receiving a write from the cache index to write (or cache) data. In step 1502, a write operation is attempted by master bucket manager 1106. If master bucket manager 1106 is not full then, in step 1504, the write operation completes and the resulting bucket address is returned to the cache index. Alternatively, if master bucket manager 1106 is full then, in step 1506, a determination is made regarding whether there any buckets in master bucket manager 1106 that are marked as migrated. If there is one or more bucket in master bucket manager 1106 that is marked as migrated (which means the data from that migrated bucket has been moved from master bucket manager 1106 to slave bucket manager 1108, making that data likely to be available for a future cache read operation and therefore a good candidate for eviction from master bucket manager 1106) then, in step 1508, the coldest bucket marked as migrated in master bucket manager 1106 is evicted and the process continues with step 1504 by completing the write operation on the evicted bucket. If there is not one or more bucket in master bucket manager 1106 that is marked as migrated in master bucket manager 1106 then the coldest bucket of the buckets in master bucket manager 1106 is evicted and the process continues with step 1504 by completing the write operation on the evicted bucket. In this way, write operations are performed in a similar fashion as with a non-tiered bucket manager when there is room in master bucket manager 1106 and evictions can be performed based on migrated, cold buckets as well as simply cold buckets, in master bucket manager 1106.

In an embodiment, eviction operations on master bucket manager 1106 and slave bucket manager 1108 operate independently of each other. Further, in light of the known art and teachings herein, such eviction operations operate to provide fair share on both (e.g., all virtual machines get to use X amount of storage in the master bucket manager and Y amount of storage in the slave bucket manager). Still further, in an embodiment, different eviction algorithms can be used in the master bucket manager than in the slave bucket manager to achieve best efficiency based on their respective requirements.

In a further embodiment, the overall amount of storage or size of each of master bucket manager 1106 and slave bucket manager 1108 can be configured, altered and adjusted or resized. In particular, a configurable ratio can be set, either by a user or by the system based on workload behavior, between the amount of storage made available for use by master bucket manager 1106 and the amount of storage made available for use by slave bucket manager 1108. Further, should the overall storage be changed, either by the system or due to some user input, this configurable ratio can be maintained by resizing each of master bucket manager 1106 and slave bucket manager 1108 as needed. As a result, the overall amount of storage and the respective usage of same by master bucket manager 1106 and slave bucket manager 1108 can be dynamically changed (increased, decreased, and/or ratio changed). Such size changes of either or both of master bucket manager 1106 and slave bucket manager 1108 can be accomplished as was described in U.S. application Ser. No. 14/609,085, incorporated by reference herein.

The disclosed method and apparatus has been explained above with reference to several embodiments. Other embodiments will be apparent to those skilled in the art in light of this disclosure. Certain aspects of the described method and apparatus may readily be implemented using configurations other than those described in the embodiments above, or in conjunction with elements other than those described above. For example, different algorithms and/or logic circuits, perhaps more complex than those described herein, may be used.

Further, it should also be appreciated that the described method and apparatus can be implemented in numerous ways, including as a process, an apparatus, or a system. The methods described herein may be implemented by program instructions for instructing a processor to perform such methods, and such instructions recorded on a non-transitory computer readable storage medium such as a hard disk drive, floppy disk, optical disc such as a compact disc (CD) or digital versatile disc (DVD), flash memory, etc., or communicated over a computer network wherein the program instructions are sent over optical or electronic communication links. It should be noted that the order of the steps of the methods described herein may be altered and still be within the scope of the disclosure.

It is to be understood that the examples given are for illustrative purposes only and may be extended to other implementations and embodiments with different conventions and techniques. For example, cache indices other than BTrees and storage systems other than SANs can be used. While a number of embodiments are described, there is no intent to limit the disclosure to the embodiment(s) disclosed herein. On the contrary, the intent is to cover all alternatives, modifications, and equivalents apparent to those familiar with the art.

In the foregoing specification, the invention is described with reference to specific embodiments thereof, but those skilled in the art will recognize that the invention is not limited thereto. Various features and aspects of the above-described invention may be used individually or jointly. Further, the invention can be utilized in any number of environments and applications beyond those described herein without departing from the broader spirit and scope of the specification. The specification and drawings are, accordingly, to be regarded as illustrative rather than restrictive. It will be recognized that the terms "comprising," "including," and "having," as used herein, are specifically intended to be read as open-ended terms of art.

What is claimed is:

1. A method of performing read commands and write commands to a tiered bucket manager comprising a master bucket manager, a slave bucket manager and a migration thread, the method comprising:
    receiving a write command sent from a first virtual machine to a host operating system running on a computing system, the write command instructing a storage system to store a first record at a first memory location, and
        storing the first record in a first bucket of the master bucket manager if the master bucket manager is not full, else
        evicting a second bucket of the master bucket manager that has been migrated to the slave bucket manager and storing the first record in the evicted second bucket of the master bucket manager, else
        evicting a third bucket of the master bucket manager and storing the first record in the third bucket of the master bucket manager; and
    receiving a read command sent from the first virtual machine to the host operating system running on the computing system, the read command instructing the storage system to read a second record from a second memory location, and
        determining that the second record is in the master bucket manager and reading the second record from the master bucket manager, else
        determining that the second record has been evicted or migrated from the master bucket manager, determining that the second record is in the slave bucket manager, reading the second record from the slave bucket manager, performing a reverse filter function on the second record read from the slave bucket manager using the migration thread, writing the reverse filter functioned second record to the master bucket manager, and reading the reverse filter functioned second record from the master bucket manager.

2. The method of claim 1, further comprising migrating a third record from the master bucket manager to the slave bucket manager by:
    determining that the master bucket manager is under pressure;
    identifying a coldest bucket of the master bucket manager;
    performing a filter function on contents of the coldest bucket of the master bucket manager using the migration thread;
    writing the filter functioned contents of the coldest bucket of the master bucket manager to the slave bucket manager;
    updating, in a translation table of the tiered bucket manager, a reference to the coldest bucket of the master bucket manager to further reference the slave bucket manager; and
    marking as migrated the coldest bucket of the master bucket manager.

3. The method of claim 1, wherein the filter function is data compression.

4. The method of claim 1, wherein the filter function is data encryption.

5. The method of claim 1, wherein the filter function performs no change to data.

6. The method of claim 1, wherein evicting the second bucket of the master bucket manager that has been migrated to the slave bucket manager further comprises determining that the second bucket of the master bucket manager is the coldest bucket of the master bucket manager.

7. The method of claim 1, wherein evicting the third bucket of the master bucket manager further comprises determining that the third bucket of the master bucket manager is the coldest bucket of the master bucket manager.

8. The method of claim 6, wherein determining that the second bucket of the master bucket manager is the coldest bucket of the master bucket manager comprises determining that the second bucket of the master bucket manager is a least recently used (LRU) bucket of the master bucket manager.

9. The method of claim 7, wherein determining that the third bucket of the master bucket manager is the coldest bucket of the master bucket manager comprises determining that the third bucket of the master bucket manager is a least recently used (LRU) bucket of the master bucket manager.

10. A tiered bucket manager comprising:
    a master bucket manager configured to store cached records;
    a slave bucket manager configured to store cached records migrated from the master bucket manager;
    a migration thread configured to migrate cached records from the master bucket manager to the slave bucket manager using a filter function; and
    a translation table configured to store references to cached records stored in the master bucket manager and cached records migrated from the master bucket manager to the slave bucket manager.

11. The tiered bucket manager of claim 10 wherein the filter function is data compression.

12. The tiered bucket manager of claim 10 wherein the filter function is data encryption.

13. The tiered bucket manager of claim 10 wherein the filter function performs no change to data.

14. A non-transitory computer readable storage medium having instructions embodied thereon, the instructions executable by one or more processors to perform read commands and write commands to a tiered bucket manager comprising a master bucket manager, a slave bucket manager and a migration thread, comprising:

receiving a write command sent from a first virtual machine to a host operating system running on a computing system, the write command instructing a storage system to store a first record at a first memory location, and storing the first record in a first bucket of the master bucket manager if the master bucket manager is not full, else evicting a second bucket of the master bucket manager that has been migrated to the slave bucket manager and storing the first record in the evicted second bucket of the master bucket manager, else evicting a third bucket of the master bucket manager and storing the first record in the third bucket of the master bucket manager; and receiving a read command sent from the first virtual machine to the host operating system running on the computing system, the read command instructing the storage system to read a second record from a second memory location, and determining that the second record is in the master bucket manager and reading the second record from the master bucket manager, else determining that the second record has been evicted or migrated from the master bucket manager, determining that the second record is in the slave bucket manager, reading the second record from the slave bucket manager, performing a reverse filter function on the second record read from the slave bucket manager using the migration thread, writing the reverse filter functioned second record to the master bucket manager, and reading the reverse filter functioned second record from the master bucket manager.

* * * * *